United States Patent [19]

Kenan

[11] 4,455,064
[45] Jun. 19, 1984

[54] SURFACE ACOUSTIC WAVE TRANSDUCER ARRAY FOR A GUIDED-WAVE ACOUSTOOPTIC DEVICE

[75] Inventor: Richard P. Kenan, Columbus, Ohio

[73] Assignee: Canon Kabushiki Kaisha, Tokyo, Japan

[21] Appl. No.: 337,313

[22] Filed: Jan. 5, 1982

[51] Int. Cl.³ .............................................. G02F 1/00
[52] U.S. Cl. ............................ 350/96.13; 350/96.14
[58] Field of Search ............... 350/96.13, 96.14, 355; 333/193, 194

[56] References Cited

PUBLICATIONS

Guided-Wave Acoustooptic Bragg Modulators for Wide Band Integrated Optic Communications and Signal Processing; C. S. Tsai; IEEE Transactions on Circuits and Systems; vol. CAS-26; No. 12; Dec. 1979.

*Primary Examiner*—David K. Moore
*Assistant Examiner*—Robert E. Wise
*Attorney, Agent, or Firm*—Fitzpatrick, Cella, Harper & Scinto

[57] ABSTRACT

An optical waveguide has a multiple tilted surface acoustic wave transducer array for diffracting a wide light beam propagating through the waveguide. Adjacent transducers are relatively positioned so that at the crossover frequency, the light beams diffracted from the transducers are added in phase.

1 Claim, 4 Drawing Figures

SURFACE ACOUSTIC WAVE TRANSDUCER ARRAY FOR A GUIDED-WAVE ACOUSTOOPTIC DEVICE

RELATED APPLICATION

This application is directed to subject matter disclosed but not claimed in copending application Ser. No. 254,470, filed Apr. 15, 1981.

BACKGROUND OF THE INVENTION

1. Field of the Invention

This invention relates to a guided-wave acoustooptic (AO) device and, more particularly, to a guided-wave AO device incorporating a surface acoustic wave (SAW) transducer array for wide band Bragg modulators and deflectors.

2. Description of the Prior Art

Wideband SAW transducers have been used for guided-wave AO devices such as scanners, spectrum analyzers and correlators and there are several known methods of making these wideband SAW transducers. Among these, a multiple tilted SAW transducer array configuration having individual interdigital transducers (IDT) having staggered center frequencies and being tilted to satisfy the Bragg condition has the advantages of simplicity and flexibility. However electronic phase shifters are manually required to compensate for the phase difference between diffracted light beams for adjacent transducers at the crossover frequency and to ensure that they add in phase.

A method to eliminate such electronic phase shifters by properly configuring the transducers is described in C. S. Tsai, *Guided-Wave Acoustooptic Bragg Modulators for Wide-Band Integrated Optic Communications and Signal Processing*, IEEE, Transactions on Circuits and Systems, Vol. CAS-26, 1072–1098 (1979). However, the equations shown therein for determining the horizontal separation and the vertical step height between each pair of adjacent transducers are not adequate, particularly when the input light beam has a large beam width. In such case, the diffraction efficiency at the crossover frequencies becomes low so that a flat diffraction efficiency over the full bandwidth cannot be obtained.

SUMMARY OF THE INVENTION

The present invention avoids the disadvantages of the prior art by means of a novel surface acoustic wave transducer array incorporated in an optical waveguide which is capable of effectively diffracting a wide light beam which propagates through the waveguide over the full bandwidth. This is achieved by arranging the transducers in light of the phase difference between rays in the center portion of the light beam diffracted by adjacent transducers at the crossover frequency.

According to one aspect of the present invention, there is provided in an optical waveguide, a surface acoustic wave transducer array for diffracting a light beam which propagates in the optical waveguide with uniform diffraction efficiency over a full bandwidth, the array comprising first and second transducers, the second transducer being disposed adjacent to and on the incident side of the light beam from the first transducer, and wherein the transducers are relatively disposed to satisfy the following equations:

$$D = y_0 \sin \Delta\theta + \frac{m \lambda \cos \psi}{2 \sin^2 \theta_c} + m' \Lambda_c \sin \Delta\theta$$

$$h = 2 y_0 \sin^2 \frac{\Delta\theta}{2} + \frac{m \lambda \sin \psi}{2 \sin^2 \theta_c} - m' \Lambda_c \cos \Delta\theta$$

where:

$$\Delta\theta = \theta_2 - \theta_1$$

$$\psi = 2\theta_c - \theta_1$$

and:

D is the distance between said first and second transducers in the direction normal to the propagation of a surface acoustic wave from said first transducer;

h is the distance between said first and second transducers in the direction of the propagation of the surface acoustic wave from said first transducer;

$y_0$ is the distance between the center of said first transducer and the interaction point where a ray being in or near the center of the light beam interacts with the surface acoustic wave launched by said first transducer; m and m' are integers;

$\Lambda_c$ is the acoustic wavelength at the crossover frequency of said transducers;

$\lambda$ is the wavelength of light in said optical waveguide;

$\theta_1$, $\theta_2$ are the Bragg angles at the center frequency for said first and second transducers; and $\theta_c$ is the Bragg angle at the crossover frequency of said transducers.

There has thus been outlined the more important features of the invention in order that the detailed description thereof that follows may be better understood and in order that the present contribution to the art may be better appreciated. However, those skilled in the art will appreciate that this invention may be utilized as a basis for designing other structures for carrying out the objects of the invention. It is therefore important that the claim be regarded as including such equivalent constructions as do not depart from the scope of the invention.

BRIEF DESCRIPTION OF THE DRAWINGS

One embodiment of the invention has been chosen for purposes of illustration and description and is shown in the accompanying drawings forming a part of the specification, wherein.

DETAILED DESCRIPTION OF THE PREFERRED EMBODIMENT

Figure 1:
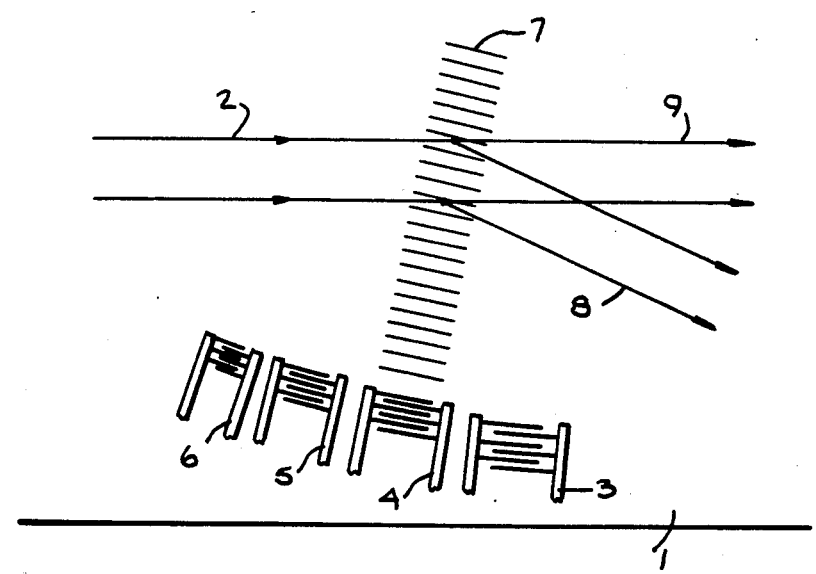
FIG. 1 is a schematic representation of the interaction between a guided light beam and SAW launched from a conventional multiple tilted SAW transducer array.

FIG. 1 shows a part of a conventional guided-wave AO device incorporating a multiple tilted SAW transducer array. The AO device includes an optical waveguide 1 such as Ti in-diffused LiNbO$_3$ for propagating a laser light beam therethrough and a plurality of interdigital transducers 3, 4, 5 and 6 fabricated on waveguide 1 for launching SAW 7. In FIG. 1, the driving frequency is such that the SAW is launched from only IDT 4.

SAW 7 may be considered as a moving grating which causes Bragg diffraction of the incident light beam 2 when the Bragg condition is approximately satisfied. The diffracted light 8 separates from the undiffracted light beam 9 for use in signal processing, recording and the like.

The individual interdigital transducers 3, 4, 5, 6 of the multiple tilted SAW transducer array have different finger pitches and different tilt angles to satisfy the Bragg condition over a large operating bandwidth. They each have their own narrow operating band width selected so that adjacent transducers have a crossover frequency where the diffraction efficiencies for the two adjacent transducers decrease to $-3$ dB or less up to about $-6$ dB depending on design choice. At a crossover frequency, SAW 7 is excited by two adjacent transducers at the same time so that the diffracted light beam 8 consists of two diffracted light beams. In order to achieve as high a diffraction efficiency at the crossover frequencies as at the center frequencies of individual transducers, the two diffracted light beams should add in phase.

Figure 2:
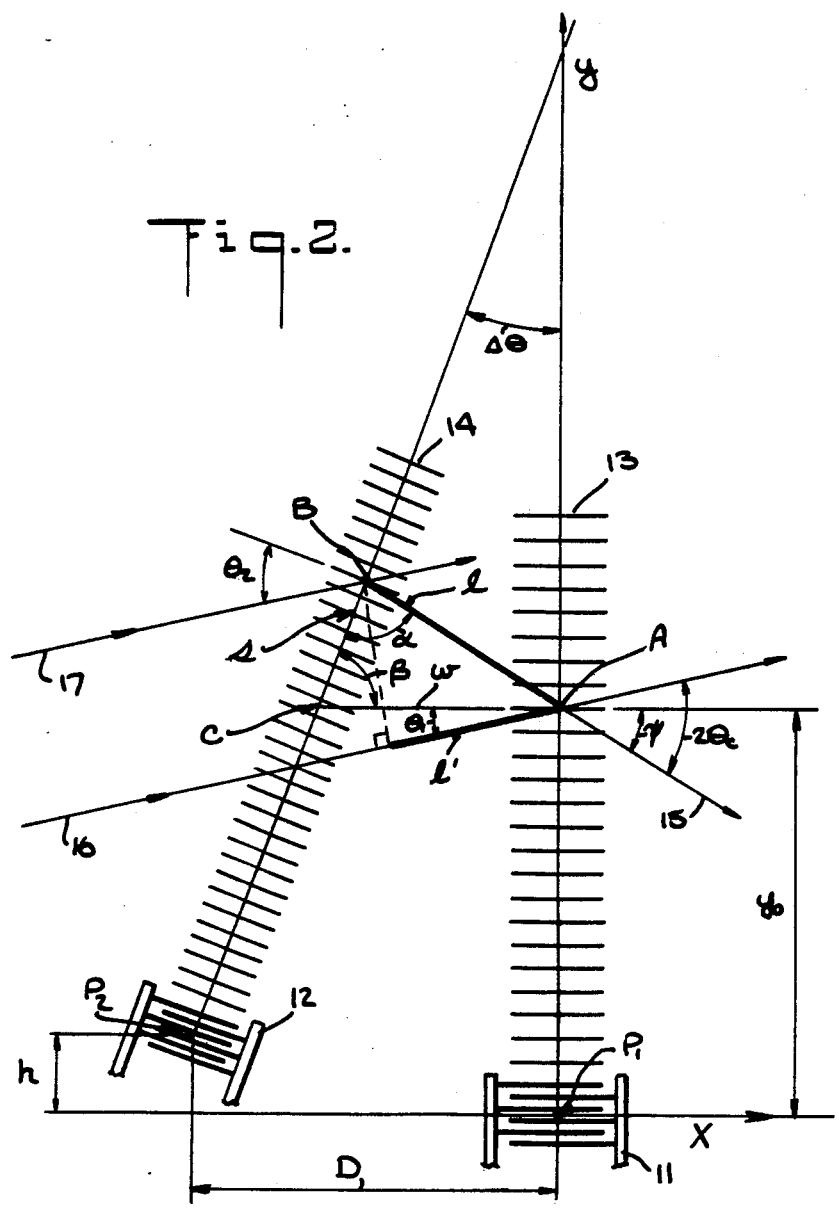
FIG. 2 is a schematic representation of a pair of transducers arranged to achieve maximum efficiently at the crossover frequency.

FIG. 2 shows how the two diffracted light beams will add in phase by the proper positioning of adjacent transducers. At the crossover frequency of the interdigital transducers 11 and 12, SAW's 13 and 14 are launched from the transducers 11 and 12 respectively. (For the sake of clarity, the other transducers are not shown in FIG. 2.) Rays 16 and 17 of the input light beam are diffracted at A and B by SAW's 13 and 14, respectively, and the two diffracted rays are combined to form a single diffracted ray 15.

The orientation and position of the transducers to achieve the desired addition of the diffracted beams, are determined as follows.

The orientation is determined by the requirement that each transducer should be addressed by the incident light beam at its Bragg angle at its center frequency.

The quantities needed for proper positioning of the transducers are D and h in FIG. 2, namely the distances between the transducer centers measured along x and y axes, respectively. It should be noted that the coordinate system is centered at transducer 11 for the positioning of transducer 12 and would be centered at transducer 12 for the next transducer. The equations for the quantities D and h are derived from the two conditions for correct phasing of the light diffracted from adjacent transducers at their common crossover frequency:

(1) The acoustic path lengths from the centers of the transducers to the points of interaction with a light ray should be equal or should differ by an integral multiple of an acoustical wavelength ($\Lambda_c$);

(2) The two contributions to the diffracted ray arising from interaction with the two SAWs 11 and 12 should be in phase, that is, the optical paths of the two contributions should be equal or differ by an integral multiple of an optical wavelength ($\lambda$). Referring to FIG. 2, the acoustic condition (1) requires that the distance $P_2B$ and the distance $P_1A$ should be equal or should differ by $m'\Lambda_c$, with $m'$ an integer. The optic condition (2) requires that the line segments $l$ and $l'$ should differ by $m\lambda$, with $m$ an integer.

Using the law of sines in the triangle ABC of FIG. 2:

$$\frac{\sin \alpha}{w} = \frac{\sin \beta}{l} = \frac{\sin \psi}{s}$$

and simple geometry shows that $$\alpha = 90° - (2\theta_c - \theta_2)\,\beta = 90° - \Delta\theta\,\psi = 2\theta_c - \theta_1.$$

Furthermore, $$w = D - (y_0 - h)\tan \Delta\theta$$

In these equations,
$\Delta\theta = \theta_2 - \theta_1$

The acoustic path difference is $$APD = s + (y_0 - h)\sec \Delta\theta - y_0$$

while the optical path difference is $$OPD = l - l' = l(1 - \cos 2\theta_c) = 2l \sin^2 \theta_c$$

Combining these relations leads to the general formulas $$D = y_0 \sin \Delta\theta + \frac{m \lambda \cos \psi}{2\sin^2\theta_c} + m'\Lambda_c \sin \Delta\theta \qquad (1)$$

$$h = 2y_0 \sin^2 \frac{\Delta\theta}{2} + \frac{m \lambda \sin \psi}{2\sin^2\theta_c} - m'\Lambda_c \cos \Delta\theta \qquad (2)$$

Wherein:
m and m' are integers that can be chosen at will by the designer (in most cases of practical interest, m' can be taken as zero; in contrast, it will usually be impossible to choose m to be zero);
$\lambda$ is the wavelength of light in the wave guide;
$y_0$ is the distance between the center of the transducer 11 and A;
$\theta_1$ & $\theta_2$ are the Bragg angles at the center frequency for transducers 11 and 12, respectively; and
$\theta_c$ is the Bragg angle at the crossover frequency.

Since Eqs. (1) and (2) contain $y_0$, the constructive interference criterion cannot be satisfied at all points of the incident optical beam. Therefore, in order to minimize the phase variation across the beam, the equations should be satisfied at the beam center.

The foregoing equations are used for the calculation of D and h for each successive transducer pair to properly position all the transducers.

The formulae described in the aforecited Tsai article are based on narrow light beams passing very close to the transducers. A large beam width, however, is needed to achieve low F number and to obtain a small spot size. Thus the Tsai equations are approximately equivalent to only the middle terms of Eqs. (1) and (2), above.

Figure 3:
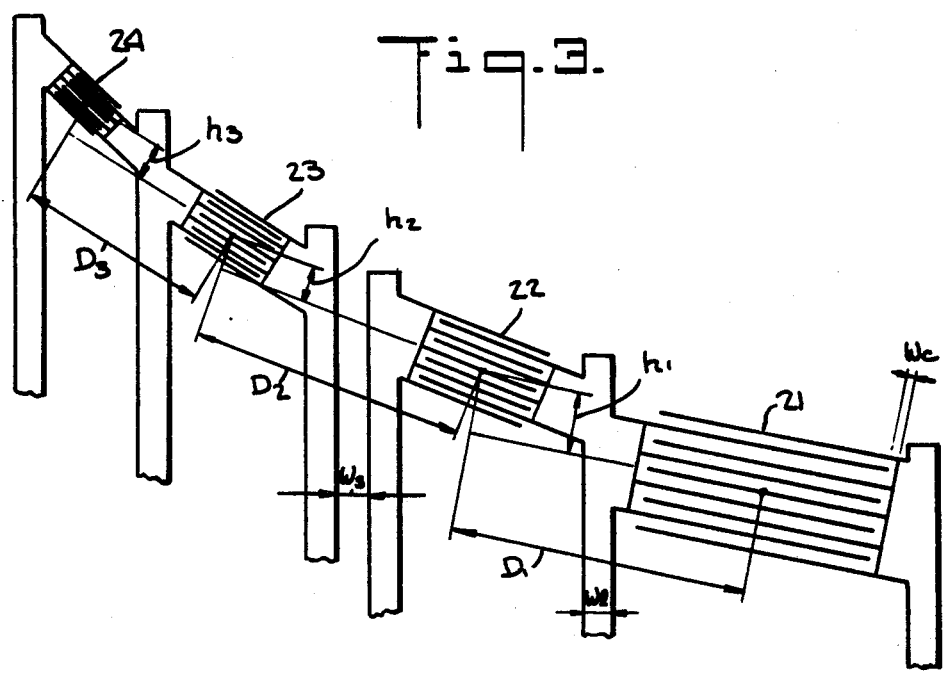
FIG. 3 is a schematic representation of a multiple tilted SAW transducer array in accordance with the present invention.

A specific illustrative embodiment of the present invention is shown in FIG. 3 where a multiple tilted SAW transducer array includes four interdigital transducers 21, 22, 23, 24 constructed to cover a 730 MHz frequency range. This array is fabricated on a Ti in-diffused $LiNbO_3$ waveguide with the aid of a photolithographic technique. A laser light source (not shown) is from a diode laser having a wavelength in air of 0.85 μm and a beam width of 6 mm. Tm₀ mode is used and the mode index is estimated to be 2.25.

Table 1 shows the center frequency $v_0$, the Bragg angle at the center frequency $\theta_B$, the length of finger overlap $W_a$ and finger width $l$ for each transducer having 4.5 finger pairs.

TABLE 1

| Transducer | $v_O$ (GHz) | $\theta_B$ (Deg) | $W_a$ (mm) | $l$ (μm) |
|---|---|---|---|---|
| 21 | 0.753 | 2.329 | 0.569 | 1.162 |
| 22 | 0.903 | 2.793 | 0.396 | 0.969 |
| 23 | 1.082 | 3.348 | 0.276 | 0.809 |
| 24 | 1.298 | 4.017 | 0.192 | 0.674 |

Table 2 shows crossover frequency $v_c$, $\theta_c$, m, $\psi$, and D and h as defined by Eqs. 1 and 2.

TABLE 2

| Transducer pair | $v_c$ (GHz) | $\theta_c$ (Deg) | m | $\psi$ (Deg) | D (mm) | h (μm) |
|---|---|---|---|---|---|---|
| 21–22 | 0.821 | 2.539 | 6 | 2.750 | 0.6190 | 27.9 |
| 22–23 | 0.985 | 3.047 | 7 | 3.301 | 0.5175 | 27.2 |
| 23–24 | 1.180 | 3.651 | 6 | 3.954 | 0.3395 | 19.6 |

Here $y_0$ is set to 5.2 mm.

In the specific illustrative embodiment shown in FIG 3, the width of the leadout line for the electrical connection to a transducer Wl and the width of the minimum space Ws between two leadout lines is 50 μm while the width of the clearance between the end of a finger and a finger-shorting bus for the adjacent fingers Wc is 20 μm. While Tables 1 and 2 provide data for a device having four interdigital transducers, the present invention is not limited by the number of the transducers, the number of finger pairs or the operating frequency range.

Tables 3 and 4 show the data for five interdigital transducer array which has been constructed having a SAW frequency bandwidth of 700 MHz for a laser beam from a laser diode having a wavelength in air of 0.84 μm in the Tm₀ mode in a Ti-LiNbO₃ waveguide having a mode index of 2.25. Each transducer has 4 finger pairs and $y_0$ is set to 5.2 mm.

TABLE 3

| Transducer | $v_O$ (GHz) | $\theta_B$ (Deg) | $W_a$ (mm) | $l$ (μm) |
|---|---|---|---|---|
| 1 | 0.3786 | 1.156669 | 1.7898 | 2.3112 |
| 2 | 0.4771 | 1.457765 | 1.1269 | 1.8339 |
| 3 | 0.6013 | 1.837282 | 0.7095 | 1.4552 |
| 4 | 0.7578 | 2.315691 | 0.4467 | 1.1547 |
| 5 | 0.9550 | 2.918847 | 0.2813 | 0.9162 |

TABLE 4

| Transducer pair | $v_c$ (GHz) | $\theta_c$ (Deg) | m | $\psi$ (Deg) | D (mm) | h (μm) |
|---|---|---|---|---|---|---|
| 1–2 | 0.4222 | 1.2899 | 5 | 1.4231 | 1.8681 | 45.8024 |
| 2–3 | 0.5321 | 1.6257 | 5 | 1.7936 | 1.1932 | 36.4006 |
| 3–4 | 0.6705 | 2.0489 | 5 | 2.2606 | 0.7728 | 28.9739 |
| 4–5 | 0.8451 | 2.5825 | 6 | 2.8493 | 0.6056 | 27.7038 |

Figure 4:
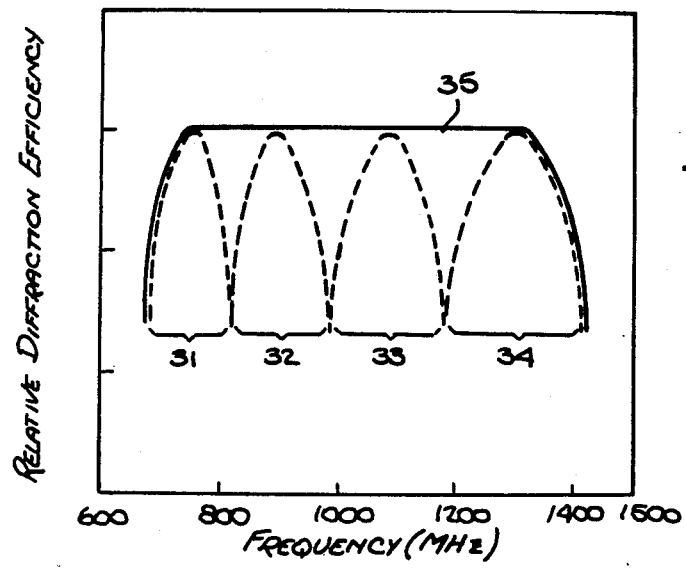
FIG. 4 is a graph showing the diffraction efficiency over the entire bandwidth with the SAW transducer array of FIG. 3.

FIG. 4 shows the characteristics of the diffraction efficiency obtainable by using the multiple tilted SAW transducer array shown in FIG. 3. Transducers 21, 22, 23, 24 have bandwidths 31, 32, 33, 34 indicated schematically by dashed lines in FIG. 4, respectively. Since transducers 21, 22, 23, 24 are properly positioned, as described above, the diffraction efficiency 35 indicated by the solid line does not dip at the crossover frequencies. Thus, over the full bandwidth in which the lowermost −3 dB point is at 0.685 GHz and the upper −3 dB point is at 1.415 GHz, the diffraction efficiency is relatively uniform. Also, since diffraction efficiency depends on the input electrical power, higher power is preferred for higher diffraction efficiency.

Having thus described the invention with particular reference to the preferred forms thereof, it will be obvious to those skilled in the art to which the invention pertains, after understanding the inventor, that various changes and modifications may be made therein without departing from the scope of the invention as defined by the claim appended hereto.

What is claimed is:

1. In an optical waveguide, a surface acoustic wave transducer array for diffracting a light beam which propagates in the waveguide with substantially uniform diffraction efficiency over the full bandwidth, said transducer array comprising:

a first transducer; and a second transducer adjacent to and on the incident side of the light beam from said first transducer, said first transducer and said second transducer being positioned to satisfy the following equations:

$$D = y_0 \sin \Delta\theta + \frac{m \lambda \cos \psi}{2 \sin^2 \theta_c} + m' \Lambda_c \sin \Delta\theta$$

$$h = 2 y_0 \sin^2 \frac{\Delta\theta}{2} + \frac{m \lambda \sin \psi}{2 \sin^2 \theta_c} - m' \Lambda_c \cos \Delta\theta$$

where:

$\Delta\theta = \theta_2 - \theta_1$ $\psi = 2\theta_c - \theta_1$ and:

D is the distance between said first and second transducers in the direction normal to the propagation of a surface acoustic wave from said first transducer; h is the distance between said first and second transducers in the direction of the propagation of the surface acoustic wave from said first transducer;

$y_0$ is the distance between the center of said first transducer and the interaction point where a ray being in or near the center of the light beam interacts with the surface acoustic wave launched by said first transducer;

m and m' are integers;

$\Lambda_c$ is the acoustic wavelength at the crossover frequency of said transducers;

$\lambda$ is the wavelength of light in said optical waveguide;

$\theta_1$, $\theta_2$ are the Bragg angles at the center frequency for said first and second transducers; and $\theta_c$ is the Bragg angle at the crossover frequency of said transducers.

* * * * *